March 9, 1954     W. G. CORSON     2,671,633
VALVE FOR INFLATABLE ARTICLES
Filed Aug. 15, 1950

*INVENTOR.*
WILLIAM G. CORSON
BY
*William Cleland*
ATTORNEY

Patented Mar. 9, 1954

2,671,633

UNITED STATES PATENT OFFICE 2,671,633

VALVE FOR INFLATABLE ARTICLES

William G. Corson, Akron, Ohio

Application August 15, 1950, Serial No. 179,500

8 Claims. (Cl. 251—122)

This invention relates to valves for inflatable articles, such as athletic balls, and in particular relates to self-sealing valves of the character described.

Heretofore, rubber self-sealing valves, having a base and an integral stem thereon, have been provided with self-sealing holes or slits of various kinds through which an inflation needle of known type is projected, against the resiliency of the stem material, for the purpose of inflating a hollow article to which the valve is attached. Such valves of known type, however, have been found objectionable because relative flexing of the stems with respect to the bases thereof caused said holes or slits to be twisted or flexed open and resulted in leakage of pressure fluid from the inflated articles.

One object of the invention is to provide a self-sealing valve of resilient material, for use on hollow inflatable articles, wherein the internal pressure of the article enhances the self-sealing characteristics of the valve to a maximum extent.

Another object of the invention is to provide a self-sealing valve of the character described, which is not affected by relative flexing of the stem with respect to the base to cause leakage of pressure fluid.

Another object of the invention is to provide a self-sealing valve as described which is of economical one-piece construction.

Other objects of the invention will be manifest from the following brief description and the accompanying drawings.

Figure 2:
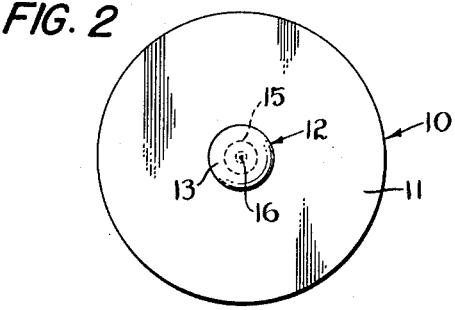
Figure 2 is a plan view of the valve removed from the ball.
Figure 3:
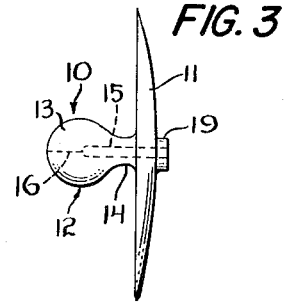
Figure 3 is a side elevation of the valve as viewed from the right of Figure 2.

Referring particularly to Figures 2 and 3 of the drawings, the numeral 10 designates a one-piece valve of vulcanized rubber or like elastic or resilient materal, and including a relatively thin base 11 from an inner side of which projects freely an integral stem 12. The outer face of the base is shown as being convex to conform to the spherical shape of a ball casing to be described later, while the inner side may be flat, as shown, or concave, the base being disc-like and provided with a chamfered or feathered edge.

The stem terminates at its free end in a generally spherical enlargement 13 which, therefore, is relatively inflexible, whereas the reduced neck portion 14 connecting the enlargement to the base is relatively flexible, for purposes to be described. The junctures of the reduced neck 14 with the enlargement 13 and of said reduced neck with the base 11 are each smoothly connected by integral portions or fillets of substantial radii, as best shown in Figure 1, for maximum resistance to cracking or breaking of the stem due to flexing of the same in use of the valve.

Extending inwardly from the concave side of the base 11, longitudinally through the stem approximately to the center of the spherical enlargement 13, may be a passage 15, for relatively free reception of an inflation needle of known type. From the inner end of passage 15 to the inner or free end of the enlargement a hole or slit 16, constituting an aligned extension of passage 15, is provided without removal of material of the stem, so that normally the passage extension 16 is maintained yieldingly self-sealed.

Figure 1:
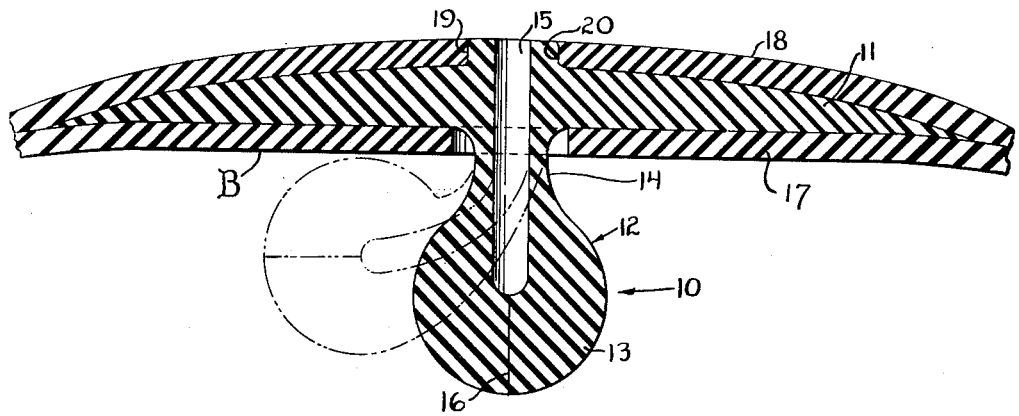
Figure 1 is a fragmentary transverse cross-section, on an enlarged scale, through a valve embodying the features of the invention, and shown incorporated in an athletic ball casing.

In use of the improved valve, as in a hollow rubber athletic ball, as shown in Figure 1, the base 10 is vulcanized, cemented or otherwise bonded between inner and outer casing layers 17 and 18 of the ball, to have the stem extending freely therein, including the reduced neck portion 14. For this purpose the base may have a cylindrical boss 19 received through an aperture 16 in the outer cover 18 of the ball, so that a flush surface will be presented around the outer end of the passage 15.

The ball B is inflatable by insertion of the usual inflation needle, on a pump or other source of pressure fluid, such as air (not shown), through the outer passage 15, and through the self-sealing extension 16 thereof against the inherent resiliency of the elastic material of the stem. Upon inflation of the ball and withdrawal of the inflation needle, the self-sealing aperture 16 will close to retain the pressure fluid within the ball. This self-sealing feature is greatly enhanced by internal pressure of the ball applied in substantially all directions on the surface of the spherical enlargement 13.

When the ball is used and abused in normal manner, flexing of the valve stem at the reduced neck portion 14 with respect to the base 11, as illustrated in chain-dotted lines in Figure 1, will not be transmitted to the relatively inflexible enlargement 13, and therefore, the material surrounding the self-sealing aperture 16 will not be distorted, flexed, or twisted to open the aperture and permit escape of pressure fluid therethrough.

Thus has been provided an efficient and effective one-piece elastic valve structure, having no self-sealing inserts, constricting devices or other separate means for retaining the needle receiving passage or aperture in fluid-sealed relation. The improved valve may be used on many types of inflatable articles other than balls. As an example, it is readily adaptable for use on rubber inner tubes for vehicle pneumatic tires. For this purpose the protuberance 19 on valve base 11 may be extended to project through the valve stem aperture in the usual vehicle tire rims, thereby to prevent slippage of the tube within the tire when the tube is deflated or under-inflated, and to facilitate ready access to the valve for inflation of the tube as described.

Modifications of the invention may be resorted to without departing from the spirit of the invention or the scope of the appended claims.

What is claimed is:

1. A valve for inflatable articles, comprising a stem of rubber-like resilient material, said stem having a free end portion of substantial volume which is solid transversely through the same and therefore substantially inflexible and not subject to substantial deformation as upon application of inflation air pressure to the exposed surfaces of the stem, said stem having a yieldingly flexible portion inwardly of said free end portion, means for mounting the stem on a said article to extend freely and unobstructedly from a wall thereof including said flexible portion of the stem, said stem having an inflation needle receiving passage therethrough, at least a part of the length of said passage within said solid free end portion being defined by opposing surface portions normally held in closed self-sealing contact by reason of the inherent tendency of the resilient material of the stem to resume normal given shape, any flexure of said stem therefore being effective at said yieldingly flexible portion thereof without being transmitted to said solid free end portion to cause distortion of the same which would open the normally self-sealed passage therethrough.

2. An inflation valve for inflatable hollow articles, comprising a stem of elastic material, said stem having a free end portion of substantial volume which is solid transversely through the same and therefore substantially inflexible and not subject to substantial deformation as upon application of inflation air pressure to the exposed surfaces of the stem, said stem having a reduced neck portion inwardly of said free end portion which is yieldingly flexible by reason of the elasticity of the material, and an attaching base connected to said reduced neck portion for mounting the stem on a said article to extend freely and unobstructedly from a wall thereof including said flexible portion of the stem, said stem having therethrough an inflation needle receiving passage, at least part of the length of said passage at said enlarged end thereof being defined by opposing surface portions normally held in self-sealing contact against passage of pressure fluid therethrough by reason of the inherent tendency of the elastic material of the stem to resume normal given shape, any flexure of said stem therefore being effective at said yieldingly flexible portion thereof without being transmitted to said solid free end portion to cause distortion of the same which would open the normally self-sealed length of the passage.

3. An inflation valve for inflatable hollow articles, comprising a stem of elastic material, said stem having a free end portion of substantial volume which is solid transversely through the same and therefore substantially inflexible and not subject to substantial deformation as upon application of squeezing pressure thereto, said stem having a reduced neck portion inwardly of said free end portion which is yieldingly flexible by reason of the elasticity of the material, and an attaching base of elastic material integrally connected to said reduced neck portion for mounting the stem on a said article to extend freely and unobstructedly from a wall thereof including said flexible portion of the stem, said stem having therethrough an inflation needle receiving passage, at least a length of said passage at said enlarged end thereof being defined by opposing surface portions normally held in self-sealing contact against passage of pressure fluid therethrough by reason of the inherent tendency of the elastic material of the stem to resume normal given shape, any flexure of said stem therefore being effective at said yieldingly flexible portion thereof without being transmitted to said solid free end portion to cause distortion of the same which would open the normally self-sealed length of the passage.

4. An inflation valve for inflatable hollow articles, comprising a stem of elastic material, said stem having a free end portion of substantial volume which is solid transversely through the same and therefore substantially inflexible and not subject to substantial deformation as upon application of inflation air pressure to the exposed surfaces of the stem, said stem having a reduced neck portion inwardly of said free end portion which is yieldingly flexible by reason of the elasticity of the material, and an attaching base connected to said reduced neck portion for mounting the stem on a said article to extend freely and unobstructedly from a wall thereof including said flexible portion of the stem, said stem having therethrough an inflation needle receiving passage, at least a part of the length of said passage at said enlarged end thereof being defined by opposing surface portions normally held in self-sealing contact against passage of pressure fluid therethrough by reason of the inherent tendency of the elastic material of the stem to resume normal given shape, any flexure of said stem therefore being effective at said yieldingly flexible portion thereof without being transmitted to said solid free end portion to cause distortion of the same which would open the normally self-sealed length of the passage, the portion of said passage between said self-sealed length and said base being of relatively large cross-section for ready reception of a said inflation needle.

5. An inflation valve for inflatable hollow articles, comprising a stem of elastic material, said stem having a generally spherical free end portion of substantial volume which is solid transversely through the same and therefore substantially inflexible and not subject to substantial deformation as upon application of inflation air pressure to the exposed surfaces of the stem, said stem having a reduced neck portion inwardly of said free end portion which is yieldingly flexible by reason of the elasticity of the material, and an attaching base connected to said reduced neck portion for mounting the stem on a said article to extend freely and unobstructedly from a wall thereof including said flexible portion of the stem, said stem having therethrough an inflation needle receiving passage, at least a part of the length of said passage at said enlarged end thereof being defined by opposing surface portions normally held in self-sealing contact against passage of pressure fluid therethrough by reason of the inherent tendency of the elastic material of the stem to resume normal given shape, any flexure of said stem therefore being effective at said yieldingly flexible portion thereof without being transmitted to said solid free end portion to cause distortion of the same which would open the normally self-sealed length of the passage.

6. A valve for inflatable articles, comprising a stem of rubber-like resilient material, said stem having a generally spherical free end portion of substantial volume which is solid transversely through the same and therefore substantially inflexible and not subject to substantial deformation as upon application of inflation air pressure to the exposed surfaces of the stem, said stem having a yieldingly flexible portion inwardly of said free end portion, means for mounting the stem on a said article to extend freely and unobstructedly from a wall thereof including said flexible portion of the stem, said stem having an inflation needle receiving passage therethrough, at least a part of the length of said passage within said solid free end portion being defined by opposing surface portions normally held in closed self-sealing contact by reason of the inherent tendency of the resilient material of the stem to resume normal given shape, any flexure of said stem therefore being effective at said yielding'y flexible portion thereof without being transmitted to said solid free end portion to cause distortion of the same which would open the normally self-sealed passage therethrough.

7. An inflation valve for inflatable hollow articles, comprising a stem of elastic material, the free end of said stem having a relatively inflexible enlargement at a free end thereof and a relatively reduced neck portion which is flexible by reason of the elasticity of the material, a base of elastic material integrally connected to said reduced neck to extend the stem freely and unobstructedly therefrom including said flexible portion, said stem having therethrough an inflation needle-receiving passage, at least a part of said passage of said enlarged end thereof being self-sealing against pressure fluid by reason of the inherent tendency of the resilient material of the stem to resume normal given shape, said self-sealing portion of said passage being a longitudinal slit having opposite walls normally engaging in self-closing relation, distortion of said stem being effective at said flexible neck portion thereof whereby such distortion will not be transmitted to said enlargement to open the self-sealing passage therein.

8. An inflation valve for inflatable hollow articles, comprising a stem of elastic material, said stem having a relatively inflexible enlargement at a free end thereof and a relatively reduced neck portion inwardly of the same which is flexible by reason of the elasticity of the material, a valve attaching portion on the end of reduced neck portion opposite said enlargement for attaching the stem to the wall of an article with said enlargement and reduced neck portion free and unobstructed within the article, said stem having therethrough an inflation needle-receiving passage, at least a part of said passage of said enlarged end thereof being self-sealing against pressure fluid by reason of the inherent tendency of the resilient material of the stem to resume normal given shape, said self-sealing portion of said passage being an elongated aperture in which no material of the stem has been removed, the remaining opposite end portion of said passage outwardly of said self-sealing portion being of relatively large cross-section, distortion of said stem being effective at said flexible neck portion thereof whereby such distortion will not be transmitted to said enlargement to open the self-sealing passage therein.

WILLIAM G. CORSON.

References Cited in the file of this patent

UNITED STATES PATENTS

| Number | Name | Date |
|---|---|---|
| 670,725 | Pickett | Mar. 26, 1901 |
| 1,509,059 | Dodge | Sept. 16, 1924 |
| 2,071,213 | Perry | Feb. 16, 1937 |
| 2,080,894 | Levinson | May 18, 1937 |